United States Patent
Rajagopalan et al.

(10) Patent No.: US 6,825,305 B2
(45) Date of Patent: Nov. 30, 2004

(54) GOLF BALLS COMPRISING NON-IONOMER GLYCIDYL POLYMER LAYERS

(75) Inventors: Murali Rajagopalan, South Dartmouth, MA (US); Kevin M. Harris, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 226 days.

(21) Appl. No.: 10/118,741

(22) Filed: Apr. 9, 2002

(65) Prior Publication Data

US 2002/0160860 A1 Oct. 31, 2002

Related U.S. Application Data

(60) Continuation-in-part of application No. 09/874,257, filed on Jun. 6, 2001, which is a division of application No. 09/233,055, filed on Jan. 20, 1999, now Pat. No. 6,290,611.

(51) Int. Cl.[7] .......................... A63B 37/00; A63B 37/12
(52) U.S. Cl. ...................... 526/273; 473/374; 473/376
(58) Field of Search .......................... 526/273; 473/374, 473/376

(56) References Cited

U.S. PATENT DOCUMENTS

| | | | | |
|---|---|---|---|---|
| 4,185,831 A | | 1/1980 | Tominaga .................... | 273/235 |
| 4,389,365 A | | 6/1983 | Ku ............................ | 264/297 |
| 4,753,980 A | | 6/1988 | Deyrup ...................... | 524/369 |
| 4,900,788 A | | 2/1990 | Subramanian ............... | 525/166 |
| 4,912,167 A | | 3/1990 | Deyrup et al. .............. | 525/166 |
| 4,914,156 A | | 4/1990 | Howe ........................ | 525/166 |
| 4,919,434 A | * | 4/1990 | Saito ......................... | 473/373 |
| 5,059,662 A | * | 10/1991 | Wikelski et al. ............ | 526/208 |
| 5,128,404 A | | 7/1992 | Howe ........................ | 524/456 |
| 5,155,157 A | | 10/1992 | Statz et al. ................. | 524/423 |
| 5,439,227 A | | 8/1995 | Egashira et al. ............ | 273/228 |
| 5,543,467 A | | 8/1996 | Hamada et al. ............. | 525/207 |
| 5,553,852 A | | 9/1996 | Higuchi et al. ............. | 473/373 |
| 5,565,524 A | | 10/1996 | Hamada et al. ............. | 525/208 |
| 5,631,324 A | | 5/1997 | Rajagopalan et al. ....... | 473/385 |
| 5,889,114 A | | 3/1999 | Statz ......................... | 525/166 |
| 5,971,869 A | | 10/1999 | Rajagopalan et al. ....... | 473/371 |
| 5,976,035 A | * | 11/1999 | Umezawa et al. ........... | 473/364 |
| 6,290,611 B1 | | 9/2001 | Rajagopalan et al. ....... | 473/371 |
| 6,334,819 B2 | * | 1/2002 | Ichikawa et al. ........... | 473/371 |

FOREIGN PATENT DOCUMENTS

| EP | 0 557 069 A1 | 2/1993 |
|---|---|---|
| EP | 0 652 254 A1 | 11/1994 |
| JP | 11137725 | * 5/1999 |

OTHER PUBLICATIONS

Thain, Science and Golf IV, p. 319–327.*

* cited by examiner

Primary Examiner—David J. Buttner
(74) Attorney, Agent, or Firm—William B. Lacy

(57) ABSTRACT

A golf ball comprising a core, a cover, and an intermediate layer disposed between the core and the cover, wherein the intermediate layer comprises a glycidyl homo-polymer having the formula:

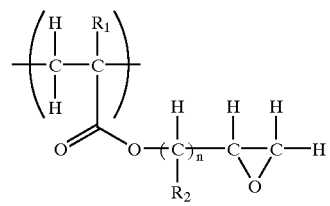

wherein $R_1$ is hydrogen, $CH_3$, linear or branched alkyl group having the formula $C_xH_{2x+1}$ where x is an integer from 1 to about 8, aromatic, or alicyclic; $R_2$ is hydrogen, $CH_3$, linear or branched alkyl group having the formula $C_yH_{2y+1}$ where y is an integer from 1 to about 20, aromatic, or alicyclic; and n is an integer ranging from 1 to about 6; or a glydidyl co-polymer having the formula:

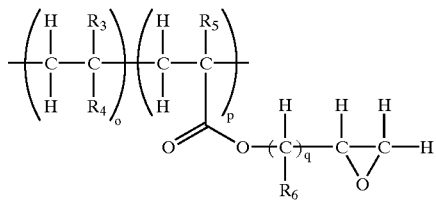

wherein $R_3$, $R_4$, and $R_5$ are hydrogen, $CH_3$, linear or branched alkyl group having the formula $C_xH_{2x+1}$, where x is an integer from 1 to about 8, aromatic, or alicyclic; $R_6$ is hydrogen, $CH_3$, linear or branched alkyl group having the formula $C_yH_{2y+1}$ where y is an integer from 1 to about 20, aromatic, or alicyclic; o ranges from about 1 to about 99 weight percent of the total polymer; p ranges from about 99 to about 1 weight percent of the total polymer; and q is an integer ranging from 1 to about 6.

30 Claims, No Drawings

GOLF BALLS COMPRISING NON-IONOMER GLYCIDYL POLYMER LAYERS

CROSS REFERENCE TO RELATED APPLICATIONS

This application is a continuation-in-part of application Ser. No. 09/874,257, filed Jun. 6, 2001, which is a divisional of U.S. application Ser. No. 09/233,055, filed Jan. 20, 1999, now U.S. Pat. No. 6,290,611.

FIELD OF THE INVENTION

This invention relates generally to golf balls, and more specifically, to a multi-layer golf ball and a composition therefore. In particular, this invention relates to a golf ball having a core, a cover and at least one intermediate layer disposed between the core and cover, wherein the intermediate layer is formed from a blend comprising at least one glycidyl polymer. The multi-layer golf balls of the present invention have been found to provide good distance, durability, and desirable playing characteristics.

BACKGROUND OF THE INVENTION

Conventional golf balls can be divided into two general types or groups: solid balls or wound balls. The difference in play characteristics resulting from these different types of constructions can be quite significant.

Balls having a solid construction are generally most popular with the average recreational golfer because they provide a very durable ball while also providing maximum distance. Solid balls are made with a solid core, usually formed of a crosslinked rubber, which is encased by a cover material. Typically the solid core is formed of polybutadiene which is chemically crosslinked with zinc diacrylate and/or similar crosslinking agents and is covered by a tough, cut-proof blended cover. The cover is generally formed of a material such as SURLYN®, which is a trademark for an ionomer resin produced by DuPont of Wilmington, Del. The combination of the core and cover materials provide a ball that is virtually indestructible by golfers. Further, such a combination imparts a high initial velocity to the ball which results in improved distance. Because the materials of which the ball is formed are very rigid, solid balls generally have a hard "feel" when struck with a club. Likewise, due to their hardness, these balls have a relatively low spin rate which provides greater distance.

Wound balls typically have either a solid rubber or liquid center core around which many yards of a stretched elastic thread or yarn are wound. The wound core is then covered with a durable cover material such as a SURLYN® or similar material or a softer cover such as balata or polyurethane. Wound balls are generally softer and provide more spin than non-wound balls, which enables a skilled golfer to have more control over the ball's flight and final position. Particularly, with approach shots into the green, the high spin rate of soft, wound balls enables the golfer to stop the ball very near its landing position.

A number of patents have been issued that are directed towards modifying the properties of a conventional solid ball by altering the typical single layer core and single cover layer construction to provide a multi-layer ball having Such as a dual cover layer, dual core layer and/or a ball having a mantle layer disposed between the cover and the core. The inventions disclosed in the prior art patents are directed towards improving a variety of golf balls physical properties that help determine "in-play" characteristics.

Several patents are directed towards improving the carry distance of such balls. For example, U.S. Pat. No. 4,863,167 relates to a three piece solid golf ball having increased flight distance, wherein the ball has a center portion and an outer layer formed from a rubber composition, wherein the outer layer is harder than the center portion and further contains a gravity-adjusting filler so as to impart a higher specific gravity to the outer layer than that of the center portion. U.S. Pat. No. 5,184,828 relates to a solid three-piece golf ball having improved rebound characteristics and carry distance while maintaining an adequate spin rate, wherein these characteristics are allegedly obtained by controlling the size of the polybutadiene inner core and outer layer as well as their specific gravity and hardness. According to the '828 patent, the key to obtaining the desired rebound characteristics is that the maximum hardness (42–62 Shore D) must be located at the interface between the core and the mantle and the hardness must then decrease both inwardly and outwardly. U.S. Pat. No. 4,714,253 is also directed towards a three-piece golf ball having an improved rebound coefficient. This golf ball has a core with a Shore C hardness of 57–80 in its center, but not more than 83 at a distance between 5–10 mm from its center and an outer layer with a Shore C hardness of 70–83.

Additionally, there are a number of patents directed towards improving the spin and feel of solid balls while maintaining the distance provided by the solid construction. For example, U.S. Pat. No. 5,072,944 discloses a three-piece solid golf ball having a center layer and an outer layer that are prepared from a rubber composition, wherein it is desirable that the center core layer is softer than the outer layer, the layers having a hardness (Shore C) of 25–50 and 70–90, respectively.

U.S. Pat. No. 4,625,964 relates to a solid golf ball having a polybutadiene rubber core of a diameter not more than 32 mm, a polybutadiene rubber intermediate layer having a specific gravity of lower than that of the core material, and a cover. U.S. Pat. No. 4,650,193 is directed towards a solid golf ball having a core comprising a central portion and an integral outer layer, wherein the core is a curable elastomer such as polybutadiene which is treated with a cure altering agent to soften an outer layer of the core, to produce a central layer with a hardness (Shore C) of greater than 75 and an outer layer with a hardness (Shore A) of less than 80.

U.S. Pat. No. 4,848,770 discloses a solid three-piece golf ball which includes a core of a highly filled synthetic rubber or polymeric material, an intermediate mantle of an unfilled synthetic rubber and a cover. The core and intermediate mantle have a hardness of between 50–95 Shore D. U.S. Pat. No. 5,002,281 is directed towards a three-piece solid golf ball which has an inner core having a hardness of 25–70 (Shore C), an outer shell having a hardness of 80–95 (Shore C) and a cover. Further, the specific gravity of the inner core must be greater than 1.0, but less than or equal to that of the outer shell, which must be less than 1.3.

The prior art discloses a variety of materials other than polybutadiene for use as intermediate layers. For example, U.S. Pat. No. 5,253,871 concerns a golf ball having a three-piece structure comprising an elastomer core, an intermediate layer of a thermoplastic material containing at least 10% of ether block copolymer, preferably blended with an ionomer, and a thermoplastic cover. U.S. Pat. No. 5,681,898 is directed to a multi-layer golf ball having a conventional polybutadiene core, an ionomer cover and an intermediate layer formed from a blend of an ethylene methacrylic acid copolymer and a vulcanizate formed from polybutadiene and a peroxide curing agent. U.S. Pat. Nos. 5,439,227 and 5,556,098 both disclose multi-layer golf balls which have a conventional polybutadiene core, conventional covers and an intermediate layer formed from a polyetherester block copolymer blended with an ionomer.

Further, there are also several patents which are directed to golf balls having multiple cover layers. For example U.S. Pat. No. 4,431,193 relates to a golf ball having a multi-layer cover wherein the inner layer is a hard, high flexural modulus ionomer resin and the outer layer is a soft, low flexural modulus ionomer resin, and wherein either or both layers may comprise a foamed ionomer resin. U.S. Pat. No. 5,314,187 also relates to golf balls having a multiple layer cover, wherein the outer layer is molded over the inner layer and comprises a blend of balata and an elastomer and the inner layer is an ionomer resin. U.S. Pat. No. 4,919,434 is directed towards a golf ball having a cover which comprises an inner layer and an outer layer, each of which comprise a thermoplastic resin. Preferably the layers are comprised of materials that are capable of bonding with each other, for example, by heat, or by other means which are readily known to one of ordinary skill in the art.

Additionally, U.S. Pat. No. 5,631,324 is directed to a golf ball wherein the terpolymer composition of the core, mantle layers, or cover comprises an epoxy (i.e., glycidyl moiety) and an ionomer material. U.S. Pat. No. 5,155,157 provides compositions useful in the manufacture of one-, two-and three-piece golf balls that comprises blends of block copolymers, an ionomer material, and an epoxy-containing compound. U.S. Pat. No. 5,565,524 provides a golf ball having a cover that comprises an ionomer material and a glycidyl-group-containing olefinic copolymer. U.S. Pat. No. 5,543,467 discloses a golf ball having a core and a cover in which the base material of the cover comprises a maleic anhydride-modified olefinic copolymer, an ionomer resin, and a glycidyl-group-containing olefinic copolymer.

However, none of the patents discussed above disclose the multi-layer ball of the current invention that employs the materials, and has the improved golf ball properties, as disclosed herein.

SUMMARY OF THE INVENTION

The present invention is directed to a golf ball comprising a core, a cover, and an intermediate layer disposed between the core and the cover, wherein the intermediate layer comprises a glycidyl homo-polymer having the formula:

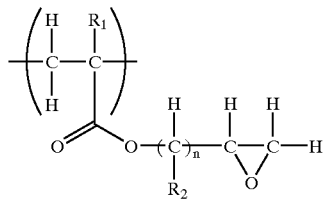

wherein $R_1$ is hydrogen, $CH_3$, linear or branched alkyl group having the formula $C_xH_{2x+1}$ where x is an integer from 1 to about 8, aromatic, or alicyclic; $R_2$ is hydrogen, $CH_3$, linear or branched alkyl group having the formula $C_yH_{2y+1}$ where y is an integer from 1 to about 20, aromatic, or alicyclic; and n is an integer ranging from 1 to about 6; or a glycidyl co-polymer having the formula:

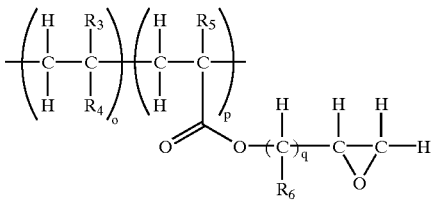

wherein $R_3$, $R_4$, and $R_5$ are hydrogen, $CH_3$, linear or branched alkyl group having the formula $C_xH_{2x+1}$, where x is an integer from 1 to about 8, aromatic, or alicyclic; $R_6$ is hydrogen, $CH_3$, linear or branched alkyl group having the formula $C_yH_{2y+1}$ where y is an integer from 1 to about 20, aromatic, or alicyclic; o ranges from about 1 to about 99 weight percent of the total polymer; p ranges from about 99 to about 1 weight percent of the total polymer; and q is an integer ranging from 1 to about 6.

The glycidyl polymer is preferably a co-polymer of olefin with glycidyl acrylate or glycidyl methacrylate comonomer. Additionally, the glycidyl polymer has a flexural modulus of greater than about 10,000 psi and, preferably, between about 55,000 psi and about 75,000 psi. The glycidyl polymer also may have a Shore D hardness of between about 55 and about 70.

In one embodiment, the intermediate layer is an outer core layer. It may also be an an inner cover layer. Ideally, the cover comprises a castable thermoset material or a thermoplastic material. The thermoset material may also include a polyurethane, polyurea, epoxy, or a mixture thereof.

In a preferred embodiment, the cover layer comprises the glycidyl homo- or co-polymer. The core of the ball has a compression of less than about 60 and the intermediate layer has a thickness of between about 0.02 inches and about 0.035 inches. In one embodiment, the core comprises a center and an outer core layer and the cover comprises an inner and an outer cover layer. At least one or both of the outer core or inner cover layers are formed of the glycidyl polymer. Preferably, the cover has a Shore D hardness of less than about 60 or, more preferably, less than about 54. Additionally, the core has a compression of less than about 80, preferably less than about 60.

At least one of the intermediate layer or cover has a thickness of less than about 0.05 inches, preferably, less than about 0.035 inches.

The present invention is also directed to a golf ball comprising a core, a cover, and an intermediate layer disposed between the core and the cover, wherein the intermediate layer consists essentially of a glycidyl homo- or co-polymer; and the glycidyl polymer has a flexural modulus of greater than about 10,000 psi.

The glycidyl polymer is preferably a co-polymer of olefin with glycidyl acrylate or glycidyl methacrylate comonomer. Additionally, the glycidyl polymer has a flexural modulus of greater than about 10,000 psi and, preferably, between about 55,000 psi and about 75,000 psi. The glycidyl polymer also may have a Shore D hardness of between about 55 and about 70.

In one embodiment, the intermediate layer is an outer core layer. It may also be an an inner cover layer. Ideally, the cover comprises a castable thermoset material or a thermoplastic material. The thermoset material may also include a polyurethane, polyurea, epoxy, or a mixture thereof.

In a preferred embodiment, the cover layer comprises the glycidyl homo- or co-polymer. The core of the ball has a compression of less than about 60 and the intermediate layer has a thickness of between about 0.02 inches and about 0.035 inches. In one embodiment, the core comprises a center and an outer core layer and the cover comprises an inner and an outer cover layer. At least one or both of the outer core or inner cover layers are formed of the glycidyl polymer. Preferably, the cover has a Shore D hardness of less than about 60 or, more preferably, less than about 54. Additionally, the core has a compression of less than about 80, preferably less than about 60.

At least one of the intermediate layer or cover has a thickness of less than about 0.05 inches, preferably, less than about 0.035 inches.

DEFINITIONS

The following terms that are used in this application are defined in terms of the enumerated ASTM tests: Specific Gravity ASTM D-297, Flexural Modulus ASTM D-790, Shore D Hardness ASTM D-2240, and Shore C Hardness ASTM D-2240. The ASTM D-297 test was carried out in lab conditions where the temperature was controlled to 20–23° C.

As used herein, the terns "points" or "compression points" refer to the compression scale or the compression scale based on the ATTI Engineering Compression Tester. This scale, which is well known to those working in this field, is used in determining the relative compression of a core or ball.

As used herein, "COR" refers to Coefficient of Restitution, which is obtained by dividing a ball's rebound velocity by its initial (i.e., incoming) velocity. This test is performed by firing the samples out of an air cannon at a vertical steel plate over a range of test velocities (from 75 to 150 ft/s). A golf ball having a high COR dissipates a smaller fraction of its total energy when colliding with the plate and rebounding therefrom than does a ball with a lower COR. Unless otherwise noted, the COR values reported herein are the values determined at an incoming velocity of 125 ft/s.

As used herein, the term "glycidyl polymer" is defined as any homopolymer, copolymer, terpolymer, or mixture thereof, having at least one glycidyl group in at least one of the monomer repeat units in the polymer.

As used herein, the term "copolymer" refers to a polymer which is formed from two or more monomers, wherein said monomers are not identical.

As used herein, the term "terpolymer" refers to a polymer which is formed from three monomers, wherein said monomers are not identical.

As used herein, the term "pph" in connection with a batch formulation refers parts by weight of the constituent per hundred parts of the base composition (e.g., elastomer).

The term "about," as used herein in connection with one or more numbers or numerical ranges, should be understood to refer to all such numbers, including all numbers in a range.

DETAILED DESCRIPTION OF THE PREFERRED EMBODIMENTS

The golf balls of the present invention may comprise any of a variety of constructions, from a simple two-piece core and cover, to a three piece dual core single cover to any multi-piece construction, but preferably include a core formed of a center and at least one outer core layer and a cover formed of an outer cover layer and at least one inner cover layer. The core and/or the cover layers may be formed of more than one layer and an intermediate or mantle layer may be disposed between the core and the cover of the golf ball. The innermost portion of the core, while preferably solid, may be a hollow or a liquid-, gel-, or air-filled sphere. As with the core, the cover layers may also comprise a plurality of layers. The core may also comprise a solid or liquid filled center around which a tensioned elastomeric material is wound.

Any of the core or cover components may be formed of or include a glycidyl polymer, but preferably, at least one of the outer core layer, inner cover layer, or both, comprise a glycidyl polymer.

In a preferred embodiment, the present invention is directed to an improved multi-layer golf ball which comprises a core, a cover, and at least one intermediate layer disposed between the core and the cover, wherein such golf ball provides a softer feel similar to a conventional wound ball, while also providing the distance, durability and spin rates of a conventional two-piece ball. The cover is formed of at least one layer, for example, inner and outer cover layers. As discussed in detail below, the improved multi-layer golf ball of the present invention is provided by forming a ball having various structural components (e.g., cover, core, intermediate layer) each having desired properties and which may be formed from a variety of materials.

Many conventional two-piece "distance" golf balls are formed with cores having a high compression (e.g., greater than about 90) in order to achieve the desired high finished ball COR and initial velocity necessary to obtain long overall distance for the ball. Balls having such high compression cores typically have a hard feel when struck with a golf club.

However, the golf balls of the present invention are formed with a core having a low compression, but still exhibit a finished ball COR and initial velocity approaching that of conventional two-piece distance balls. Preferably, the cores employed in the golf balls of the present invention have a compression of less than about 60, more preferably about 45 to about 60 and most preferably about 50 to 55. Likewise, it is preferred that the finished balls made with such cores have a COR, measured at an inbound speed of 125 ft./sec., of about 0.795 to about 0.815, more preferably about 0.797 to about 0.812 and most preferably about 0.800 to about 0.810.

Additionally, it is preferred the core has a Shore C hardness of about 65 to about 80, more preferably about 68 to about 75 and most preferably about 72 to about 75. Preferably, the core has a Shore D hardness within 10 Shore D of the Shore D hardness of the intermediate layer.

The cores employed in the golf balls of the present invention preferably have a diameter of about 1.25 inches to about 1.51 inches, more preferably about 1.30 inches to about 1.48 inches and most preferably about 1.39 inches. The overall diameter of the core and the intermediate layer is about 84 percent to about 97 percent of the overall diameter of the finished ball.

A representative base composition for forming the cores employed in the present invention comprises polybutadiene and, in parts by weight based on 100 parts polybutadiene, 20–50 parts of a metal salt of an $\alpha,\beta$-unsaturated carboxylic acid, such as diacrylate, dimethacrylate, or monomethacrylate. Preferably, the metal salt of an $\alpha,\beta$-unsaturated carboxylic acid is zinc diacrylate. The polybutadiene preferably has a cis-1,4 content of above about 90% and more preferably above about 96%. Commercial sources of polybutadiene include SHELL® 1220 manufactured by Shell Chemical, NEOCIS® BR40 manufactured by Enichem Elastomers, and UBEPOL® BR150 manufactured by Ube Industries, Ltd. If desired, the polybutadiene can also be mixed with other elastomers known in the art, such as natural rubber, styrene butadiene, and/or isoprene in order to further modify the properties of the core. When a mixture of elastomers is used, the amounts of other constituents in the core composition are usually based on 100 parts by weight of the total elastomer mixture. In a preferred embodiment, the polybutadiene has a Mooney viscosity greater than about 50.

Metal salt diacrylates, dimethacrylates, and monodiethacrylates suitable for use in the cores employed in this invention include those wherein the metal is magnesium, calcium, zinc, aluminum, sodium, lithium or nickel. Zinc diacrylate is preferred, because it provides golf balls with a high initial velocity in the United States Golf Association ("USGA") test. The zinc diacrylate can be of various grades of purity. For the purposes of this invention, the lower the quantity of zinc stearate present in the zinc diacrylate the higher the zinc diacrylate purity. Zinc diacrylate containing less than about 10% zinc stearate is preferable. More preferable is zinc diacrylate containing about 4 to about 8% zinc stearate. Suitable, commercially available zinc diacrylates include those from Sartomer. The preferred concentrations of zinc diacrylate that can be used are 20–50 pph based upon 100 pph of polybutadiene or alternately, polybutadiene with a mixture of other elastomers that equal 100 pph.

Free radical initiators are used to promote cross-linking of the metal salt diacrylate, dimethacrylate, or monomethacrylate and the polybutadiene. Suitable free radical initiators for use in the invention include, but are not limited to peroxide compounds, such as dicumyl peroxide, 1,1-di(t-butylperoxy) 3,3,5-trimethyl cyclohexane, bis(t-butylperoxy) diusopropylbenzene, 2,5-dimethyl-2,5 di (t-butylperoxy) hexane, or di-t-butyl peroxide, and mixtures thereof. Other useful initiators would be readily apparent to one of ordinary skill in the art without any need for experimentation. The initiator(s) at 100% activity are preferably added in an amount ranging between about 0.05 and 2.5 pph based upon 100 parts of butadiene, or butadiene mixed with one or more other elastomers. More preferably, the amount of initiator added ranges between about 0.15 and 2 pph and most preferably between about 0.25 and 1.5 pph.

The invention also includes a method to convert the cis-isomer of the polybutadiene resilient polymer component to the trans- isomer during a molding cycle and to form a golf ball. A variety of methods and materials have been disclosed in U.S. Pat. No. 6,162,135 and U.S. application Ser. No. 09/461,736, filed Dec. 16, 1999; Ser. No. 09/458,676, filed Dec. 10, 1999; and Ser. No. 09/461,421, filed Dec. 16, 1999, each of which are incorporated herein, in their entirety, by reference.

Typical prior art golf ball cores incorporate 5 to 50 pph of zinc oxide in a zinc diacrylate-peroxide cure system that cross-links polybutadiene during the core molding process. However, in the present invention it is preferred that the zinc oxide in the core composition is eliminated in favor of calcium oxide. Cores produced from an admixture containing CaO have been found to exhibit desirable performance properties. In particular, when ZnO is replaced with CaO, it has been observed that the initial velocity and COR of the core is maintained, but the compression of the core is reduced by at least about 4 compression points on the standard compression scale, and may be reduced as much as 6 points. Additionally, the combination of the use of calcium oxide and a higher percentage of zinc diacrylate can be used to maintain the same compression as with the zinc oxide, but the initial velocity and COR is significantly increased. Thus, by using calcium oxide, either the core compression can be lowered and the initial velocity and COR maintained or the amount of zinc diacrylate can be increased so that the core compression is the same and the initial velocity and COR is increased.

Typically the calcium oxide added to the core-forming composition employed in the present invention is in the range of about 0.1 to 15, preferably 1 to 10, most preferably 1.25 to 5, parts calcium oxide per hundred parts of polybutadiene.

The core compositions employed in the present invention may also include fillers, added to the elastomeric composition to adjust the density and/or specific gravity of the core. As used herein, the term "fillers" includes any compound or composition that can be used to vary the density and other properties of the subject golf ball cores. Fillers useful in the golf ball core according to the present invention include, for example, zinc oxide (in an amount significantly less than that which would be necessary without the addition of the calcium oxide), barium sulfate, and regrind (recycled core molding matrix ground to 30 mesh particle size). The amount and type of filler utilized is governed by the amount and weight of other ingredients in the composition, since a maximum golf ball weight of 1.620 oz has been established by the USGA. Appropriate fillers generally used range in specific gravity from about 2.0 to 5.6. In the preferred golf ball, the amount of filler in the core is lower than that of a typical golf ball such that the specific gravity of the core is decreased.

The preferred range of specific gravities of the cores employed in the present invention is from about 1.0 to about 1.2, more preferably in the range of about 1.1 to about 1.18, depending upon the size of the core, cover, intermediate layer and finished ball, as well as the specific gravity of the cover and intermediate layer.

Other ingredients such as accelerators, e.g. tetra methylthiuram, processing aids, processing oils, plasticizers, dyes and pigments, antioxidants, as well as other additives well known to the skilled artisan may also be used in the present invention in amounts sufficient to achieve the purpose for which they are typically used.

The intermediate layer, cover inner layer, or both, of the golf balls of the present invention are formed from a blend which includes a glycidyl polymer. The glycidyl polymer can be selected from a group including at least one of a homopolymer, a copolymer, a terpolymer, or a mixture thereof. The homopolymer produced from a repeat unit containing a glycidyl group is of the form:

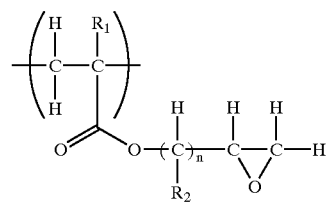

wherein $R_1$ is hydrogen, $CH_3$, linear or branched alkyl group having the formula $C_xH_{2x+1}$ where x is an integer from 1 to about 8, aromatic, or alicyclic; $R_2$ is hydrogen, $CH_3$, linear or branched alkyl group having the formula $C_yH_{2y+1}$ where y is an integer from 1 to about 20, aromatic, or alicyclic; and n is an integer ranging from 1 to about 6.

The copolymer containing a glycidyl group is of the form:

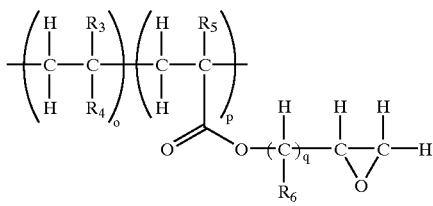

wherein $R_3$, $R_4$, and $R_5$ are hydrogen, $CH_3$, linear or branched alkyl group having the formula $C_xH_{2x+1}$, where x is an integer from 1 to about 8, aromatic, or alicyclic; R6 is hydrogen, $CH_3$, linear or branched alkyl group having the formula $C_yH_{2y+1}$ where y is an integer from 1 to about 20, aromatic, or alicyclic; o ranges from about 1 to about 99 weight percent of the total polymer; p ranges from about 99 to about 1 weight percent of the total polymer; and q is an integer ranging from 1 to about 6.

The terpolymer containing a glycidyl group is of the form:

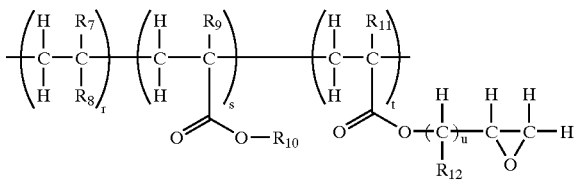

wherein $R_7$, $R_8$, $R_9$, and $R_{11}$ are hydrogen, $CH_3$, linear or branched alkyl group having the formula $C_xH_{2x+1}$ where x is an integer from 1 to about 8, aromatic, or alicyclic; $R_{10}$ and $R_{12}$ are hydrogen, $CH_3$, linear or branched alkyl group having the formula $C_yH_{2y+1}$ where y is an integer from 1 to about 20, aromatic, or alicyclic; r ranges from about 1 to about 99 weight percent of the total polymer; s ranges from about 1 to about 50 weight percent of the total polymer; t ranges from about 1 to about 30 weight percent of the total polymer; and u is an integer ranging from about 1 to about 6.

Examples of alkyl groups include lower alkyl, for example, methyl, ethyl, n-propyl, iso-propyl, n-butyl, isobutyl or tert-butyl; higher alkyl, for example, octyl, nonyl, decyl, and the like. One of ordinary skill in the art is familiar with numerous linear and branched alkyl groups which are within the scope of the present invention.

Examples of glycidyl polymers include various types of resins such as ethylene-glycidyl methacrylate copolymer, ethylene-glycidyl methacrylate-methyl acrylate terpolymer, and ethylene-glycidyl methacrylate-methyl vinyl acetate terpolymer. Commercially available glycidyl polymers are ELVALLOY®, from DuPont of Wilmington, Del., and LOTADER® from Elf-Atochem, of Philadelphia, Pa.

In one embodiment of the present invention, the intermediate layer is formed from a blend which comprises glycidyl polymer and a second component which comprises a thermoplastic material. Suitable thermoplastic materials for use in the intermediate blend include, but are not limited to, polyesterester block copolymers, polyetherester block copolymers, polyetheramide block copolymers, ionomer resins, dynamically vulcanized thermoplastic elastomers, hydrogenated styrene-butadiene elastomers with functional groups such as maleic anhydride or sulfonic acid attached, thermoplastic polyurethanes, thermoplastic polyesters, polymers formed using a metallocene catalyst ("metallocene polymers") and/or blends thereof. Any of the above materials may be neutralized greater than about 80%, preferably greater than about 90%, and most preferably greater than about 100%.

Suitable thermoplastic polyetheresters include materials which are commercially available from DuPont of Wilmington, Del., under the tradename HYTREL® and include HYTREL® 3078, HYTREL® G3548W and HYTREL® G4078W. Suitable thermoplastic polyetheramides are commercially available from Elf-Atochem of Philadelphia, Pa., under the tradename PEBAX® and include PEBAX® 2533, PEBAX® 1205 and PEBAX® 4033. Suitable thermoplastic ionomer resins include any number of olefinic based ionomers such as SURLYN® and IOTEK®. Suitable dynamically vulcanized thermoplastic elastomers include SANTOPRENE®, SARLINK®, VYRAM®, DYTRON®, and VISTAFLEX®. SANTOPRENE® is the trademark for a dynamically vulcanized PP/EPDM. SANTOPRENE® 203-40 is an example of a preferred SANTOPRENE® and is commercially available from Advanced Elastomer Systems. Examples of suitable functionalized hydrogenated styrene-butadiene elastomers having functional groups such as maleic anhydride or sulfonic acid, include KRATON® FG-1901x and FG-1921x, which are commercially available from the Shell Corporation. Examples of suitable thermoplastic polyurethanes include ESTANE® 58133, ESTANE® 58134 and ESTANE® 58144, which are commercially available from the B.F. Goodrich Company of Cleveland, Ohio. Suitable metallocene-catalyzed polymers, i.e., polymers formed with a metallocene catalyst, include those commercially available from Sentinel Products of Hyannis, Mass. Suitable thermoplastic polyesters include poly(butylene terephthalate), poly (ethylene terepthalate), and poly(trimethylene terepthalate).

Preferably, the second component of the intermediate layer blend comprises polyetherester block copolymer, with HYTREL® 3078 being a particularly preferred polyetherester block copolymer.

Generally, many prior art intermediate layers have a specific gravity of about 1 or less. However, in a preferred embodiment, the intermediate layer employed in the golf balls of the present invention has a specific gravity greater than 1.2, preferably about 1.21 to about 1.30, more preferably about 1.23 to about 1.29 and most preferably about 1.27.

The desired specific gravity of the intermediate layer may be obtained by adding a filler such as barium sulfate, zinc oxide, titanium dioxide and combinations thereof to the intermediate layer blend. Zinc oxide is the preferred filler.

The intermediate layers of the present invention are formed from an intermediate layer blend comprising up to 100 percent by weight of glycidyl polymer. In one embodiment, any cover layer, such as an outer core layer, an intermediate layer, a casing or a mantle, an inner cover layer, or an outer cover layer, may be formed of the homo- and co-polymers of olefin with glycidyl acrylate or methacrylate described herein. In this embodiment, it is preferred that the glycidyl polymer has a flexural modulus greater than about 10,000 psi and, more preferably, between about 40,000 psi and about 70,000 psi and, most preferably, between about 55,000 psi and about 70,000 psi, particularly when layer is an inner cover layer for a double-cover construction golf ball. Additionally, it is preferred that the glycidyl polymer have a Shore D hardness of between about 25 and about 75 and, more preferably, between about 55 and about 70. Glycidyl polymers of this nature are described by the homo- and co-polymer structures above, particularly when propylene-based homo- or co-polymers are used to synthesize the glycidyl polymers of the invention, increasing flexural modulus and hardness.

Intermediate layers of this construction have a thickness between about 0.02 inches and about 0.085 inches, more preferably between about 0.02 inches and about 0.06 inches and, most preferably, between about 0.03 inches and about 0.035 inches.

In one embodiment of the present invention, the intermediate layer is formed from a blend of about 1 to about 99 percent by weight of a glycidyl polymer, about 0 to about 75 percent by weight of the second thermoplastic component (as describe above) and about 0 to about 50 percent by weight zinc oxide. In one embodiment of the present invention, the intermediate layer is formed from a blend of about 10 to 50 percent by weight glycidyl polymer, 25 to 75 percent by weight of a second thermoplastic component and about 5 to about 40 percent by weight zinc oxide. In another embodiment of the present invention, the intermediate layer is formed from a blend of about 15 to about 30 percent by weight glycidyl polymer, about 40 to about 70 percent by weight of a second thermoplastic component and about 15 to about 30 percent by weight zinc oxide. In another embodiment of the invention, the second thermoplastic component is present in the intermediate layer blend in an amount of less than about 65 percent by weight, and preferably about 55 to 63 percent by weight. Most preferably, the intermediate layer of the present invention comprises 100 percent of a glycidyl polymer.

The intermediate layer blend preferably has a flexural modulus of less than about 10,000 psi, more preferably about 5,000 to about 8,000 psi and most preferably about 7,500 psi. Alternatively, the intermediate layers of the present invention also may have a flexural modulus of greater than 10,000 psi and preferably between about 55,000 psi and about 75,000 psi. Likewise, the intermediate layers employed in the golf balls of the present invention preferably have a Shore D hardness of about 25 to 50, and more preferably about 27 to about 40. Alternatively, the intermediate layers of the present invention have a Shore D hardness of between about 55 and about 70.

The intermediate layers employed in the golf balls of the present invention preferably have a thickness from about 0.020 inches to about 0.125 inches, more preferably about 0.035 inches to about 0.085 inches and most preferably about 0.06 inches The outer diameter of the intermediate layer is preferably about 1.510 to 1.580 inches.

The cover layer of the present invention comprises at least one layer of a thermoplastic or thermosetting material. Any number of a wide variety of cover materials may be used in the present invention, such as ionomer resins, polyurethanes, balata and blends thereof, with ionomer resins being preferred.

Ionomers, such as acid-containing ethylene copolymer ionomers, include E/X/Y copolymers where E is ethylene, X is a softening comonomer such as acrylate or methacrylate present in 0–50 (preferably 0–25, most preferably 0–2), weight percent of the polymer, and Y is acrylic or methacrylic acid present in 5–35 (preferably 10–35, most preferably 15–20) weight percent of the polymer, wherein the acid moiety is neutralized 100%, preferably 1–90% (more preferably at least 40%, most preferably at least about 60%) to form an ionomer by a cation such as lithium, sodium, potassium, magnesium, calcium, barium, lead, tin, zinc or aluminum, or a combination of Such cations, lithium, sodium and zinc being the most preferred. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which these ionomers are made is well known in the art as described in U.S. Pat. No. 3,262,272. As mentioned above, ionomer resins are commercially available from DuPont of Wilmington, Del., under the tradename SURLYN®, and Exxon under the tradename IOTEK®.

As is well known in the art, ionomer resins may be blended in order to obtain a cover having desired characteristics. For this reason, it is preferable that the covers of the golf balls of the present invention be formed from a blend of two or more ionomer resins.

A particularly preferred cover material for use in the present invention is formed from a blend of about 50 percent by weight SURLYN® 7940, about 47 percent by weight SURLYN® 8940 and about 3 percent by weight SURLYN® 8660.

In another preferred embodiment, the cover(s) comprise polyurethanes. Suitable polyurethanes, polyureas, or epoxies, generally comprise the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("$H_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate;1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Preferably, the polyisocyanate includes MDI, PPDI, TDI, or a mixture thereof. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The polyisocyanate should have less than about 14% unreacted NCO groups. Preferably, the at least one polyisocyanate has no greater than about 7.5% NCO, and more preferably, less than about 7.0%. It is well understood in the art that the hardness of polyurethane can be correlated to the percent of unreacted NCO groups.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes a polyether polyol, such as polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups.

Polyamine curatives are also suitable for use in polyurethane covers. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives include both primary and secondary amines.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Preferred hydroxy-terminated curatives include 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy] ethoxy} benzene; 1,4-butanediol, and mixtures thereof.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a particularly preferred embodiment of the present invention, saturated (aliphatic) polyurethanes are used to form cover layers, preferably the outer cover layer. The thermoset polyurethanes may be castable, reaction injection moldable, sprayable, or applied in a laminate form or by any technical known in the art. The thermoplastic polyurethanes may be processed using any number of compression or injection techniques. In one embodiment, the saturated polyurethanes are substantially free of aromatic groups or moieties.

The cover layers employed in the present invention preferably have a Shore D hardness of less than about 72, preferably 54 to about 72, more preferably about 65 to about 70 and most preferably about 68 to about 70. Alternatively, the intermediate or cover layers of the present invention have a Shore D hardness of less than about 65, preferably less than about 54.

It should be understood that the composition of any of the above layers, such as core layers, intermediate or mantle layers, or cover layers, may include additives, such as pigments, foaming agents, inert/reactive fillers, including ceramic spheres, glass spheres, etc., as would be readily determined by one of ordinary skill in the art.

The multi-layer golf ball of the invention can have an overall diameter of any size. Although the USGA specifications limit the minimum size of a competition golf ball to 1.680 inches in diameter or more, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The golf balls of the present invention have an overall maximum compression of about 90, preferably about 75 to about 85, more preferably about 80 to about 85 and most preferably about 82.

The golf balls of the present invention can be made by any conventional processes employed in the golf ball art. For example, the solid cores can be either injection or compression molded. The intermediate layer is subsequently injection or compression molded about the core. It is important that the intermediate layer material be able to sustain the temperatures applied during the application of the cover layer. The cover layer or layers are then injection or compression molded or cast about the intermediate layer. The intermediate layers may also be molded around any solid core by a reaction product injection molding process, not considered conventional by the molding community.

EXAMPLES

The cores of multi-layer balls were formed by compression molding a blend of the batch formulation set forth in Table 1 below.

TABLE I

Core Batch Formulation

| Material | Parts Per Hundred |
|---|---|
| Polybutadiene (CARIFLEX ® 1220) | 76.00 |
| Rubber (NEOCIS ® BR-40) | 24.00 |
| Pigment | 0.10 |
| Zinc Diacrylate | 24.79 |
| Calcium Oxide | 2.16 |
| Regrind | 6.47 |
| Peroxide (VAROX ® 231 XL) | 0.43 |
| Peroxide (ELASTOCHEM ® DBDB EF-60) | 0.16 |
| Filler | 22.64 |
| Process Oil | 1.50 |

All of the cores had a diameter of about 1.39 inches and were measured to have compressions ranging from about 45 to 55 and specific gravities of from about 1.134 to 1.146. For the above core batch formulation, the resultant cores were measured to have a compression of 48. The intermediate layer blends of Table 2 were subsequently injection molded about the cores of Table 1 to form the intermediate layers of the balls having an outer diameter of about 1.51 inches.

TABLE II

Intermediate Layer Formulation

| Formulation | Example 1 (weight %) | Example 2 (weight %) | Example 3 (weight %) | Control (weight %) |
|---|---|---|---|---|
| Hytrel 3078[1] | 59 | 59 | 59 | 59 |
| Nucrel 960[2] | — | — | — | 20 |
| Zinc oxide | 21 | 21 | 21 | 21 |
| Lotader 8900[3] | 20 | — | — | — |
| Lotader 8930[4] | — | 20 | — | — |
| Lotader 8920[5] | — | — | 20 | — |

[1]block copoly(ether-ester) elastomer, from DuPont, having a Shore D of about 30.
[2]ethylene-methacrylic acid copolymer, from DuPont, having a Shore D of 46.
[3]ethylene-23.5 wt. % methyl acrylate-7.25 weight percent glycidyl methacrylate terpolymer, from Elf-Atochem, having a Shore A of 70.
[4]ethylene-26 wt. % methyl acrylate-1.0 weight percent glycidyl methacrylate terpolymer, from Elf-Atochem.
[5]ethylene-24.0 wt. % methyl acrylate-3.0 weight percent glycidyl methacrylate terpolymer, from Elf-Atochem, having a Shore A of 75.

All of the multi-layer balls had a cover composition formed by compression molding a blend comprising 50% SURLYN® 7940 and 50% SURLYN® 8940 and a sufficient amount of titanium dioxide concentrate about the intermediate layers and were subsequently finished using conventional clear coating and buffing techniques. The finished golf balls had an outer diameter of about 1.68 inches. These balls were tested for initial velocity, compression, cover hardness, and COR, the results of Such tests are set forth in Table 3 below.

As can be seen in Table 3, both mantle layers and golf balls prepared according to the present invention, shown as the compositions presented in Examples 1–3 in Table 2 above, exhibit low compression, i.e., soft "feel," while retaining high initial velocity or COR.

TABLE III

Mantle Layer and Ball Properties

| | Example 1 | Example 2 | Example 3 | Control |
|---|---|---|---|---|
| Mantle Properties | | | | |
| Hardness[1] | 32 | 33 | 31 | 38 |
| Compression | 47 | 47 | 47 | 51 |
| COR[2] | 0.758 | 0.756 | 0.757 | 0.762 |
| Ball Properties | | | | |
| Cover Hardness[1] | 67 | 67 | 67 | 67 |
| Compression | 76 | 75 | 75 | 81 |
| COR[2] | 0.792 | 0.788 | 0.792 | 0.798 |
| Initial Velocity (ft/s) | 251.1 | 251.1 | 251.0 | 251.2 |

[1]Shore D hardness
[2]Adjusted COR at 125 ft/s incoming velocity

Table IV below describes two golf balls, one having a glycidyl polymer inner cover layer as described by the present invention. For both balls, identical 1.55-inch diameter cores were surrounded by an inner cover layer having a thickness of 0.035 inches and an outer cover layer having a thickness of 0.030 inches, to provide a golf ball outer diameter of 1.68 inches. The inner cover layer of the control golf ball was formed of a 50/50 Na/Li blend of SURLYN® 8945 and SURLYN® 7940. The outer cover layer of both golf balls comprises a PMS1088 prepolymer, commercially available from Polyurethane Specialties Co. (77.8%) cured with ETHACURE® 300, commercially available from Albemarle Corp. (18.7%), and white dispersion, commercially available from Harwich Chemical (3.5%).

TABLE IV

Golf Ball Having Glycidyl Polymer Inner Cover Layer

| Casing Composition | Example 1 | Control |
|---|---|---|
| LOTADER ® 8840[1] | 100 | — |
| ionomer blend | — | 100 |
| Properties from Flex Bar | | |
| Flexural Modulus (kpsi)[2] | 16.3 | 56.9 |
| Hardness (Shore D)[2] | 44 | 60 |
| Properties from Inner Cover Layer | | |
| Compression (avg) | 78 | 89 |
| Coefficient of Restitution[3] | 0.814 | 0.809 |

[1]E-8% glycidyl methacrylate from AtoFina;
[2]aged 2 weeks;
[3]measured at 125 ft/s It is clear from the data in Table IV that the golf ball formed with a glycidyl polymer inner cover layer has decreased flex modulus, hardness, and compression, while concurrently increasing the coefficient of restitution.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a core, a cover, and an intermediate layer disposed between the core and the cover, wherein the intermediate layer has a thickness of about 0.02 inches to about 0.125 inches and comprises a glycidyl polymer, the glycidyl polymer having a Shore D hardness ofbetween about 55 and about 70.

2. The golf ball of claim 1, wherein the intermediate layer is an outer core layer or an inner cover layer.

3. The golf ball of claim 1, wherein the cover comprises a castable thermoset material.

4. The golf ball of claim 3, wherein the thermoset material comprises polyurethane, polyurea, epoxy, or a mixture thereof.

5. The golf ball of claim 1, wherein the core comprises a center and an outer core layer and the cover comprises an inner and an outer cover layer.

6. The golf ball of claim 5, wherein at least one of the outer core or inner cover layers comprises a glycidyl polymer.

7. The golf ball of claim 1, wherein the cover has a Shore D hardness of less than about 60.

8. The golf ball of claim 1, wherein the core has a compression of less than about 80.

9. The golf ball of claim 1, wherein the cover has a thickness of less than about 0.05 inches.

10. The golf ball of claim 1, wherein the intermediate layer is sequentially encased by at least one inner cover layer and an outer cover layer comprised in the cover.

11. The golf ball of claim 1, wherein the core has a Shore D hardness within 10 units of that of the intermediate layer.

12. The golf ball of claim 1, wherein the glycidyl polymer comprises a homopolymer having a repeating unit of:

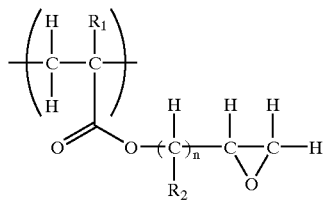

wherein $R_1$ is hydrogen, linear or branched alkyl group having the formula $C_xH_{2x+1}$ where x is an integer of 1 to about 8, aromatic group, or alicycic group; $R_2$ is hydrogen, linear or branched alkyl group having the formula $C_yH_{2y+1}$ where y is an integer of 1 to about 20, aromatic group, or alicyclic group; and n is an integer of 1 to about 6; a copolymer having the form:

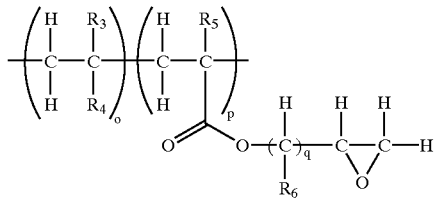

wherein $R_3$ to $R_5$ are independently hydrogen, linear or branched alkyl group having the formula $C_xH_{2x+1}$ where x is an integer of 1 to about 8, aromatic, or alicyclic; $R_6$ is hydrogen, linear or branched alkyl group having the formula $C_yH_{2y+1}$ where y is an integer of 1 to about 20, aromatic group, or alicyclic group; at least one of $R_3$, $R_4$, and $R_6$ is other than hydrogen, or $R_5$ is other than $CH_3$; o is about 1 to about 99 weight percent of the total copolymer; p is about 99 to about 1 weight percent of the total copolymer; and q is an integer of 1 to about 6; or a terpolymer having the form:

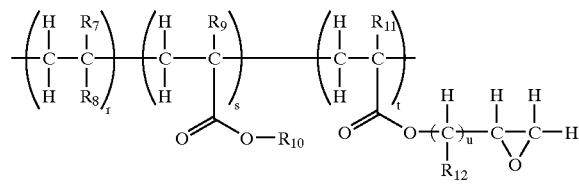

wherein $R_7$, $R_8$, $R_9$, and $R_{11}$ are independently hydrogen, linear or branched alkyl group having the formula $C_xH_{2x+1}$ where x is an integer of 1 to about 8, aromatic group, or alicyclic group; $R_{10}$ and $R_{12}$ are independently hydrogen, linear or branched alkyl group having the formula $C_yH_{2y+1}$ where y is an integer of 1 to about 20, aromatic group, or alicyclic group; r is about 1 to about 99 weight percent of the total terpolymer; s is about 1 to about 50 weight percent of the total terpolymer; t is about 1 to about 30 weight percent of the total terpolymer; and u is an integer of 1 to about 6.

13. The golf ball of claim 1, wherein the material of the cover comprises one or more glycidyl polymers.

14. The golf ball of claim 1, wherein the intermediate layer has a specific gravity of 1.2 or greater.

15. The golf ball of claim 1, wherein the golf ball has a coefficient of restitution of about 0.795 to about 0.815.

16. A golf ball comprising a core, a cover, and an intermediate layer disposed between the core and the cover, wherein the intermediate layer has a thickness of about 0.02 inches to about 0.125 inches and comprises a glycidyl polymer, the glycidyl polymer has a flexural modulus of about 40,000 psi to about 75,000 psi, and the cover compnscs a castable thermoset material.

17. The golf ball of claim 16, wherein the glycidyl polymer comprises a homopolymer having a repeating unit of:

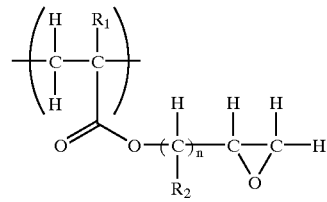

wherein $R_1$ is hydrogen, linear or branched alkyl group having the formula $C_xH_{2x+1}$ where x is an integer of 1 to about 8, aromatic group, or alicyclic group; $R_2$ is hydrogen, linear or branched alkyl group having the formula $C_yH_{2y+1}$ where y is an integer of 1 to about 20, aromatic group, or alicyclic group; and n is an integer of 1 to about 6; a copolymer having the form:

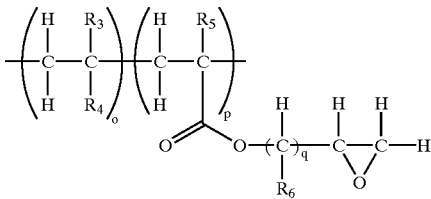

wherein $R_3$ to $R_5$ are independently hydrogen, linear or branched alkyl group having the formula $C_xH_{2x+1}$ where x is an integer of 1 to about 8, aromatic, or alicyclic; $R_6$ is hydrogen, linear or branched alkyl group having the formula $C_yH_{2y+1}$ where y is an integer of 1 to about 20, aromatic group, or alicyclic group; at least one of $R_3$, $R_4$, and $R_6$ is other than hydrogen, or $R_5$ is other than $CH_3$; o is about 1 to about 99 weight percent of the total copolymer; p is about 99 to about 1 weight percent of the total copolymer; and q is an integer of 1 to about 6; a terpolymer having the form:

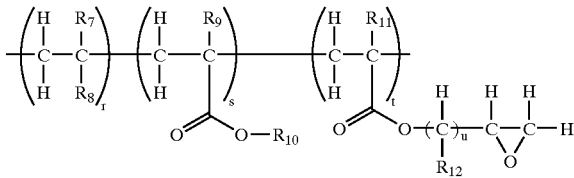

wherein $R_7$, $R_8$, $R_9$, and $R_{11}$ are independently hydrogen, linear or branched alkyl group having the formula $C_xH_{2x+1}$ where x is an integer of 1 to about 8, aromatic group, or alicyclic group; $R_{10}$ and $R_{12}$ are independently hydrogen, linear or branched alkyl group having the formula $C_yH_{2y+1}$ where y is an integer of 1 to about 20, aromatic group, or alicyclic group; r is about 1 to about 99 weight percent of the total terpolymer; s is about 1 to about 50 weight percent of the total terpolymer; t is about 1 to about 30 weight percent of the total terpolymer; and u is an integer of 1 to about 6; or a blend thereof.

18. The golf ball of claim 16, wherein the flexural modulus of the glycidyl polymer is between about 55,000 psi and about 75,000 psi.

19. The golf ball of claim 16, wherein the glycidyl polymer has a Shore D hardness of between about 55 and about 70.

20. The golf ball of claim 16, wherein the intermediate layer is an outer core layer or an inner cover layer.

21. The golf ball of claim 16, wherein the thermoset material comprises polyurethane, polyurea, epoxy, or a mixture thereof.

22. The golf ball of claim 16, wherein the core comprises a center and an outer core layer and the cover comprises an inner and an outer cover layer.

23. The golf ball of claim 22, wherein at least one of the outer core or inner cover layers comprises a glycidyl polymer.

24. The golf ball of claim 16, wherein the cover has a Shore D hardness of less than about 60.

25. The golf ball of claim 16, wherein the core has a compression of less than about 80.

26. The golf ball of claim 16, wherein at least one of the intermediate layer or cover has a thickness of less than about 0.05 inches.

27. The golf ball of claim 16, wherein the intermediate layer has a flexural modulus of about 55,000 psi to about 75,000 psi.

28. The golf ball of claim 16, wherein the intermediate layer comprises greater than 50 weight percent and up to 100 weight percent of the glycidyl polymer or a blend of two or more glycidyl polymers which comprises the glycidyl polymer.

29. The golf ball of claim 16, wherein the core has a first hardness, and the intermediate layer has a second hardness within 10 Shore D units of the first hardness.

30. The golf ball of claim 16, wherein the golf ball has a coefficient of restitution of about 0.795 to about 0.815.

* * * * *